US012782555B2

(12) United States Patent
Billsberry

(10) Patent No.: US 12,782,555 B2
(45) Date of Patent: Nov. 3, 2026

(54) DUAL ARCHITECTURE RADAR SWITCHABLE BETWEEN PULSED AND CONTINUOUS SIGNALS

(71) Applicant: Rockwell Collins, Inc., Cedar Rapids, IA (US)

(72) Inventor: Mark Billsberry, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 191 days.

(21) Appl. No.: 18/922,028

(22) Filed: Oct. 21, 2024

(65) Prior Publication Data

US 2026/0110797 A1 Apr. 23, 2026

(51) Int. Cl.

| | |
|---|---|
| ***G01S 13/95*** | (2006.01) |
| ***G01S 7/28*** | (2006.01) |
| ***G01S 7/282*** | (2006.01) |
| ***G01S 7/35*** | (2006.01) |
| ***G01S 13/933*** | (2020.01) |

(52) U.S. Cl.

CPC .......... *G01S 13/953* (2013.01); *G01S 7/2813* (2013.01); *G01S 7/282* (2013.01); *G01S 7/35* (2013.01); *G01S 13/933* (2020.01)

(58) Field of Classification Search

CPC .......... G01S 7/2813; G01S 7/282; G01S 7/35; G01S 13/933; G01S 13/963

USPC ........................................................ 342/26 B

See application file for complete search history.

(56) References Cited

U.S. PATENT DOCUMENTS

| | | | | |
|---|---|---|---|---|
| 6,011,506 | A * | 1/2000 | Li | G01S 13/003 342/175 |
| 8,988,275 | B2 * | 3/2015 | Kisliansky | G01S 13/56 342/28 |
| 9,128,189 | B1 | 9/2015 | West et al. | |
| 10,024,953 | B2 | 7/2018 | Johnson et al. | |
| 10,324,166 | B2 | 6/2019 | West et al. | |
| 10,788,569 | B2 * | 9/2020 | Lin | G01S 7/0233 |
| 11,181,616 | B2 | 11/2021 | Vacanti et al. | |
| 2010/0109938 | A1 * | 5/2010 | Oswald | G01S 13/522 707/E17.014 |
| 2015/0285897 | A1 | 10/2015 | Kilty et al. | |
| 2018/0196124 | A1 * | 7/2018 | Vacanti | G01S 7/41 |
| 2020/0264271 | A1 * | 8/2020 | Liu | G01S 7/34 |
| 2021/0208272 | A1 * | 7/2021 | Lavian | H03L 7/091 |
| 2023/0010398 | A1 | 1/2023 | Wall et al. | |

(Continued)

*Primary Examiner* — Brady W Frazier
(74) *Attorney, Agent, or Firm* — Suiter Swantz IP

(57) ABSTRACT

A system may include a first signal generator communicatively couplable to a first antenna via a switch and configured to generate a carrier signal for a pulsed radar signal. A system may include a second signal generator communicatively couplable to the first antenna via the switch and coupled to an image reject mixer, the second signal generator configured to: transmit, when the first signal generator is communicatively coupled to the first antenna, a local oscillator continuous wave signal to the image reject mixer, and transmit, when the second signal generator is communicatively coupled to the first antenna 1) a first frequency modulated continuous wave signal via the first antenna, and 2) a second frequency modulated continuous wave signal to the image reject mixer, wherein the third continuous wave is mixed with a reflection of the first frequency modulated continuous wave signal received by the second antenna.

20 Claims, 4 Drawing Sheets

(56) References Cited

U.S. PATENT DOCUMENTS

| | | | | |
|---|---|---|---|---|
| 2023/0184925 | A1* | 6/2023 | Fonts | G01S 13/885<br>342/127 |
| 2023/0213644 | A1 | 7/2023 | Wall et al. | |
| 2024/0337679 | A1* | 10/2024 | Happ | G01R 29/0871 |

* cited by examiner

DUAL ARCHITECTURE RADAR SWITCHABLE BETWEEN PULSED AND CONTINUOUS SIGNALS

BACKGROUND

In commercial aircraft, weather radar and detect and avoid (DAA) radar function can be performed by traditional pulsed radar systems. However, these radar systems may not be able to be utilized for runway environment imaging, taxi guidance, or ground obstacle detection. Contiuous wave radar systems, such as frequency-modulated continuous wave (FMCW) radar, can support these functions. However, the continuous wave radar systems may not be suitable for long-range weather detection. Furthermore, adding extra and separate radar systems may not be feasible due to space, cost, and weight concerns. Therefore, there is a need to increase the functionality of radar on an aircraft while avoiding the limitations mentioned above.

SUMMARY

In some embodiments, the techniques described herein relate to a radar sub-system including: a first signal generator communicatively couplable to a first antenna via a switch and configured to generate a carrier signal for a pulsed radar signal, wherein the pulsed radar signal is transmitted via the first antenna; an image reject mixer configured to receive a reflected signal from a second antenna; a second signal generator capable of synthesizing a single fixed frequency or frequency modulated continuous wave signals, the second signal generator communicatively couplable to the first antenna via the switch and coupled to the image reject mixer, the second signal generator configured to: generate, when the first signal generator is communicatively coupled to the first antenna, a local oscillator continuous wave signal to the image reject mixer, wherein the local oscillator continuous wave signal is mixed with a reflection of the pulsed radar signal; and generate, when the second signal generator is communicatively coupled to the first antenna 1) a first frequency modulated continuous wave signal via the first antenna, and 2) a second frequency modulated continuous wave signal to the image reject mixer, wherein the second frequency modulated continuous wave signal is mixed with a reflection of the first frequency modulated continuous wave signal received by the second antenna; and the switch configured to connect the first antenna to either the first signal generator or the second signal generator.

In some embodiments, the techniques described herein relate to a radar sub-system, further including an analog/digital converter (ADC) configured to receive an output of the image reject mixer.

In some embodiments, the techniques described herein relate to a radar sub-system, wherein the reflection of the pulsed radar signal or the reflection of the first frequency modulated continuous wave signal is processed via quadrature down conversion.

In some embodiments, the techniques described herein relate to a radar sub-system, wherein the reflection of the pulsed radar signal or the reflection of the first frequency modulated continuous wave signal is further processed by the ADC operating in a first Nyquist band.

In some embodiments, the techniques described herein relate to a radar sub-system, further including one or more RF bandpass filters communicatively coupled to the second antenna.

In some embodiments, the techniques described herein relate to a radar sub-system, further including one or more high-pass intermediate frequency (IF) filters communicatively coupled to the second antenna.

In some embodiments, the techniques described herein relate to a radar sub-system, further including one or more low-pass IF filters communicatively coupled to the second antenna.

In some embodiments, the techniques described herein relate to a radar sub-system, wherein the pulsed radar signal includes a weather radar signal.

In some embodiments, the techniques described herein relate to a radar sub-system, wherein the first frequency modulated continuous wave signal includes a taxi guidance signal.

In some embodiments, the techniques described herein relate to a radar sub-system, wherein the first signal generator is integrated within a transceiver module of active electronically scanned array (AESA) radar system.

In some embodiments, the techniques described herein relate to a method for switching a mode of operation of a radar sub-system from a pulsed radar mode to a continuous wave mode including: transmitting via a first signal generator a carrier signal for a pulsed radar signal, wherein the pulsed radar signal is transmitted from a first antenna; transmitting via a second signal generator a local oscillator continuous wave signal to an image reject mixer; mixing a returned pulse radar signal with the local oscillator continuous wave signal. operating a switch, wherein operating the switch decouples the first signal generator from the first antenna and couples the second signal generator to the first antenna; transmitting via the second signal generator a first frequency modulated continuous wave signal, wherein the first frequency modulated continuous wave signal is transmitted from the first antenna; and transmitting via the second signal generator a second frequency modulated continuous wave signal to the image reject mixer; and mixing a returned first frequency modulated continuous wave signal with the second frequency modulated continuous wave signal.

In some embodiments, the techniques described herein relate to a method, wherein the radar sub-system includes: the first signal generator; the image reject mixer; and the second signal generator In some embodiments, the techniques described herein relate to a method, further including sending an output of the image reject mixer to an analog/digital converter (ADC)

In some embodiments, the techniques described herein relate to a method, further including processing a reflection of the pulsed radar signal or a reflection of the first frequency modulated continuous wave signal via quadrature down conversion.

In some embodiments, the techniques described herein relate to a method, wherein the reflection of the pulsed radar signal or the reflection of the first frequency modulated continuous wave signal is further processed by the ADC operating in a first Nyquist band.

In some embodiments, the techniques described herein relate to a method, further including filtering the returned pulse radar signal via one or more RF bandpass filters.

In some embodiments, the techniques described herein relate to a method, further including filtering an intermediate frequency output from the image reject mixer via one or more high-pass intermediate frequency (IF) filters.

In some embodiments, the techniques described herein relate to a method, further including filtering an intermediate frequency output received from the one or more high-pass IF filters via one or more low-pass intermediate frequency filters.

In some embodiments, the techniques described herein relate to a method, wherein the first frequency modulated continuous wave signal includes a taxi guidance signal.

In some embodiments, the techniques described herein relate to a method, wherein the first signal generator is integrated within a transceiver module of active electronically scanned array (AESA) radar system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
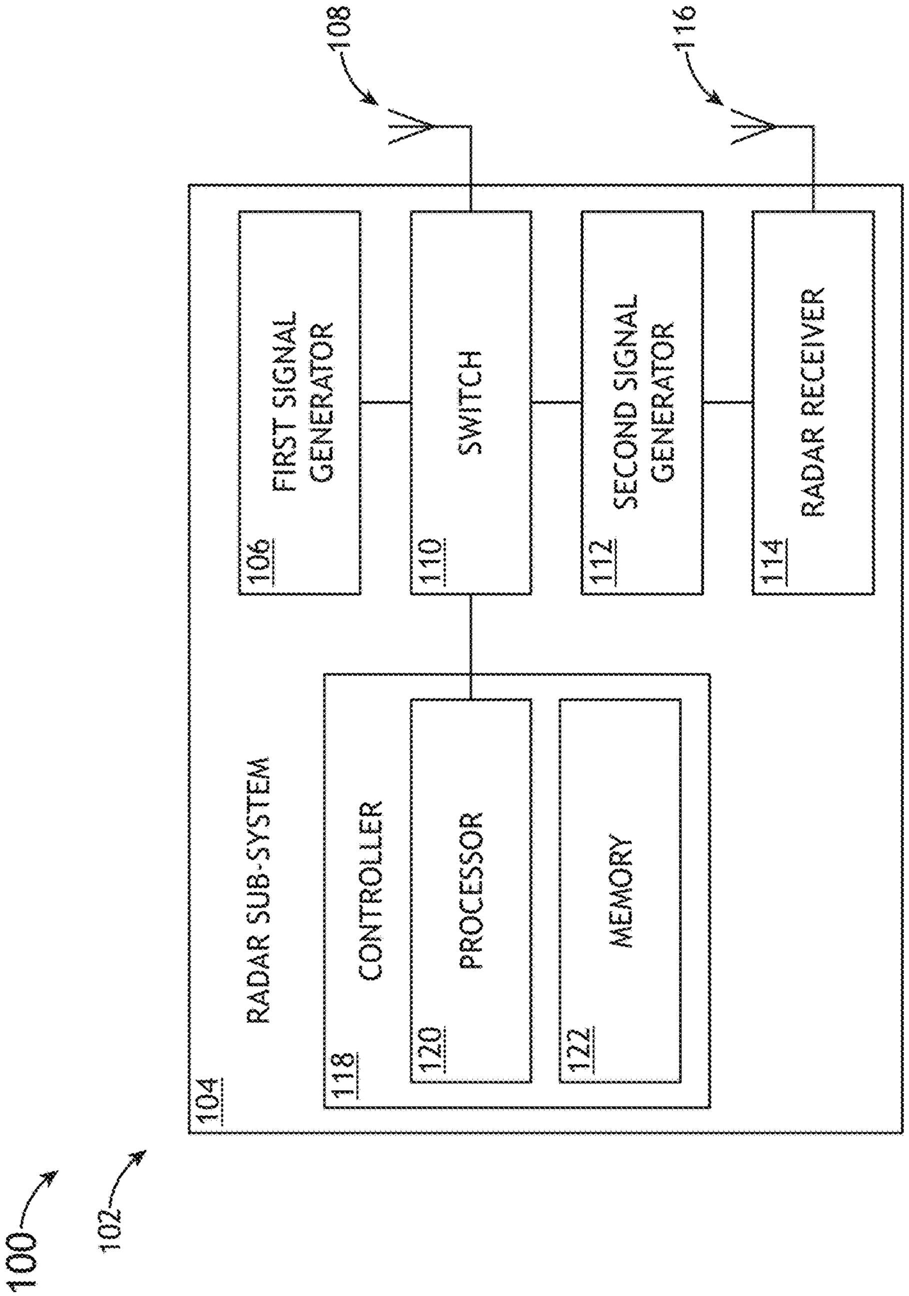
FIG. 1 illustrates a block diagram of a system, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present), and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the concepts disclosed herein are directed to a radar system that includes a dual radar architecture. The radar system is configured to support both pulsed radar functionality (e.g., for weather and detect-and-avoid (DAA) radar functions) and a Frequency-Modulated Continuous Wave (FMCW) radar functionality (e.g., for runway and ground obstacle detection functions). The radar system includes a first signal generator that generates a carrier wave of a pulsed radar signal and a second signal generator that can generate both a local oscillator signal for mixing with the reflected pulsed radar signal, as well as both the carrier continuous wave signal for transmission and the local oscillator mixing signal for received signals when performing FMCW radar functions. The radar system includes a switch that switches the radar system between pulsed radar function and FMCW function.

Embodiments of the present disclosure are particularly advantageous, as the radar system incorporates dual radar functionality without requiring the cost, space, and weight of adding two separate radar systems. The radar system also provides dual radar functionality without compromising the performance of either pulsed or FMCW functions. The radar system may be fitted, or retrofitted, onto aircraft already having one of the two types of radar systems, effectively increasing aircraft radar functions without great cost.

Referring now to FIGS. 1-4, systems and methods for providing dual radar functionality to an aircraft are illustrated in accordance with one or more embodiments of the present disclosure.

FIG. 1 illustrates a block diagram of a system 100, in accordance with one or more embodiments of the disclosure. The system may include an aircraft 102. The aircraft 102 may include any type of aircraft including, but not limited to, a fixed-wing aircraft, rotary wing aircraft, piloted aircraft, remote piloted aircraft, and uncrewed aerial vehicle (UAV).

In embodiments, the system 100 includes a radar sub-system 104 capable of functioning via multiple waveforms. For example, the radar sub-system 104 may have the ability to function as a pulsed signal-based system and as a continuous wave signal-based system. For instance, the radar sub-system 104 may be configured to switch back and forth between operating as a pulsed signal system and a continuous wave system.

In embodiments, the pulsed signal function of the radar sub-system 104 operates or provides an effect similar to other pulsed radar systems such as, but not limited to, weather radar systems, DAA radar systems, airborne fire control radar systems, surveillance radar systems, ground mapping radar systems, and synthetic aperture radar systems. For example, the pulsed signal function of the radar sub-system 104 may operate as a weather radar system on board an aircraft 102.

In embodiments, the continuous wave signal function of the radar sub-system 104 operates or provides an effect similar to other continuous wave systems, such as systems utilizing FMCW. These continuous wave systems include, but are not limited to, high-resolution runway environment imaging systems, taxi guidance systems, obstacle detection systems, doppler radar systems, collision avoidance systems, fighter targeting systems, telemetry systems, and range finding systems.

In embodiments, the radar sub-system includes a first signal generator 106 communicatively couplable to a first antenna 108 via a switch 110 and configured to generate a carrier wave as part of a pulsed radar signal. The pulsed radar signal produced in part by the first-signal generator is then transmitted via a first antenna 108 when the switch 110 has coupled the first signal generator 106 to the first antenna 108. The first signal generator 106 may include any type of signal generating device capable of generating a carrier wave and/or pulsed radar signal including, but not limited to, a frequency synthesizer, an oscillator (e.g., a local oscillator or a solid-state oscillator), a magnetron, a klystron, a solid-state amplifier, a traveling wave tube (TWT), a Field-effect transistor (FET)-based transmitter, or an integrated circuit transmitter.

In embodiments, the radar sub-system 104 includes a second signal generator 112 couplable to the first antenna 108 via the switch 110 and coupled to a radar receiver 114. The second signal generator 112 is configured to generate different continuous wave signals depending on the mode of operation of the radar sub-system 104. For example, and in embodiments, when the radar sub-system 104 is operating in pulsed signal mode, where the first signal generator 106 is coupled to the first antenna 108 and the second signal generator 112 is not coupled to the first antenna 108 (e.g., via the switch 110), the second signal generator 112 sends a local oscillator continuous wave signal to the radar receiver 114. The local oscillator continuous wave signal is then mixed with the pulsed radar signal that has been reflected and received by a second antenna 116. The switch 110 acts as a signal generator source switch or a local oscillator selection switch.

In embodiments, the second signal generator 112 is configured to transmit a first frequency modulated continuous wave signal via the first antenna 108. For example, when the radar sub-system 104 is operating in continuous wave mode, where the first signal generator 106 is not coupled to the first antenna 108 and the second signal generator 112 is coupled to the first antenna 108 (e.g., via the switch 110), the second signal generator 112 sends a first frequency modulated continuous wave signal via the first antenna 108. The second signal generator may also send a second frequency modulated continuous wave signal to the radar receiver 114. The second frequency modulated continuous wave signal is then mixed with the first frequency modulated continuous wave signal that has been reflected and received by the second antenna 116. In this manner, the radar sub-system 104 may switch back and forth from pulsed signal mode to continuous wave (e.g., FMCW) mode via first signal generator 106 (e.g., a pulsed signal transmitter) and a second signal generator 112 that can function as either a signal generator for generating continuous wave signals for reflection or generating and sending signals to the radar receiver 114 for mixing.

The second signal generator 112 may include any type of signal generating device capable of generating continuous wave energy including, but not limited to, a local oscillator, solid-state transmitters, frequency synthesizers, voltage-controlled oscillators, microstrip or monolithic integrated circuit (MMIC) transmitters, or laser diodes. For example, the second signal generator 112 may include a frequency synthesizer capable of generating or synthesizing the local oscillator continuous wave signal, a single fixed frequency, the second continuous wave signal, and the second frequency modulated continuous wave signal. The switch 110 may include any type of switching device including, but not limited to, RF switches, coaxial switches, relay switches, solid-state switches, matrix switches, and digital switches.

In embodiments, the radar sub-system 104 includes one or more controllers 118 communicatively coupled to the switch 110 and configured to control one or more processes of the radar sub-system 104. The controller 118 may include one or more processors 120 configured to execute program instructions maintained on a memory 122. For example, the one or more processors 120 of the one or more controllers 118 may be configured to, upon an input of an operator or a predetermined condition (e.g., a flight altitude) cause the switch 110 to couple the first signal generator 106 to the first antenna 108 and decouple the second signal generator 112 from the first antenna 108. Conversely, the one or more processors 120 of the one or more controllers 118 may be configured to cause the switch 110 to decouple the first signal generator 106 from the first antenna 108 and coupled the second signal generator 112 to the first antenna 108. While the one or more controllers 118 are shown communicatively coupled to the switch 110 in FIG. 1, the one or more controllers may also be communicatively coupled to one or more components of the system 100 and radar sub-system 104 including, but not limited to, the first signal generator 106, the second signal generator 112, and the radar receiver 114. Therefore, the above description should not be considered a limitation of the system 100 and radar sub-system 104, but rather an illustration.

Figure 2:
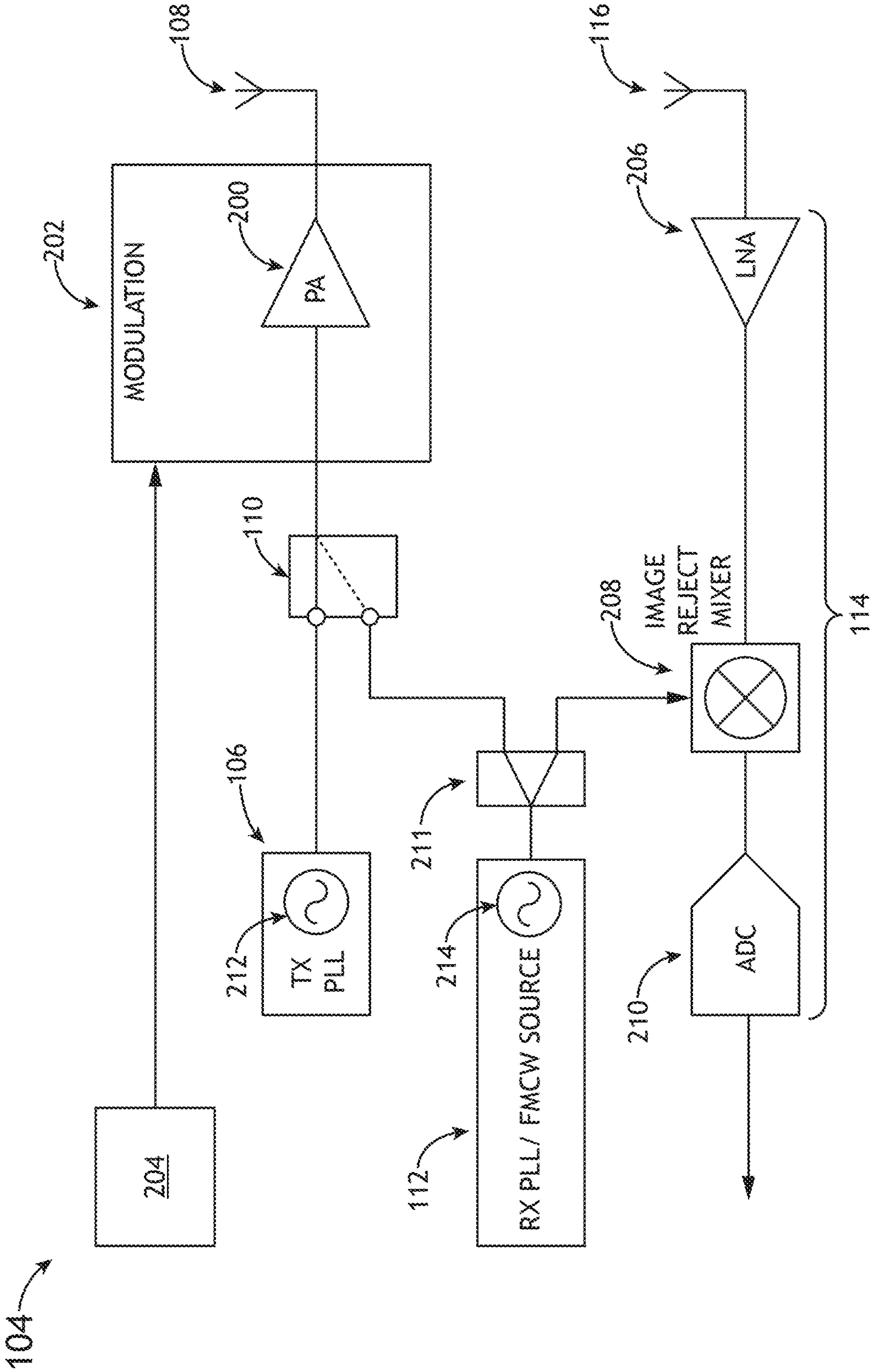
FIG. 2 illustrates a simplified schematic of the radar sub-system, in accordance with one or more embodiments of the disclosure.

FIG. 2 illustrates a simplified schematic of the radar sub-system 104, in accordance with one or more embodiments of the disclosure. In embodiments, the radar sub-system 104 includes or is associated with a power amplifier (PA) 200 configured to receive and amplify outgoing signals before the outgoing signals are transmitted via the first antenna 108. For example, the power amplifier may amplify the pulsed radar signal and/or the second continuous wave signal.

In embodiments, the radar sub-system 104 includes or is associated with a modulator 202 configured to mix pulses, such as short, high-voltage pulses from a pulse generator 204 with the carrier wave generated by the first signal generator 106. In an embodiment, the modulator modulates the second continuous wave signal.

In embodiments, the radar receiver 114 includes a low noise amplifier 206, an image reject mixer 208, and an analog/digital converter (ADC) 210 configured to receive an output of the image reject mixer (e.g., a mixed radar return signal). The radar receiver 114 is configured to receive both pulsed signals and continuous wave signals. The second signal generator 112 is coupled to the image reject mixer 208, which is used for mixing both pulsed and continuous wave signals. For example, when the radar sub-system 104 is switched to pulsed mode, the image reject mixer 208 receives the local oscillator continuous wave signal (e.g., a pulse signal-specific local oscillator (LO) signal) from the second signal generator 112 that is used to mix with the incoming reflected pulsed signal that was initially generated via the first signal generator 106. The incoming reflected pulsed signal may be amplified by the low noise amplifier 206 before mixing. In another example, when the radar sub-system 104 is switched to continuous wave mode, the image reject mixer receives the second frequency modulated continuous wave signal (e.g., a continuous wave signal-specific local oscillator signal) from the second signal generator 112 that is used to mix with the incoming reflected continuous wave signal that was initially generated via the second signal generator 112. The incoming reflected continuous wave signal may be amplified by the low noise amplifier 206 before mixing.

In embodiments, the radar sub-system 104 includes a junction 211 configured to guide the local oscillator continuous wave signal and the second frequency modulated continuous wave signal toward the image reject mixer 208 as well as guide the first frequency modulated continuous wave signal toward the first antenna 108, depending on the position of the switch 110 and the signal generated by the second signal generator 112. The junction 211 may include any type of switching mechanism.

In embodiments, the first signal generator 106 includes a first phase-locked loop (PLL) 212 (e.g., a transmitter phase-locked loop). The first PLL 212 may be configured to generate the carrier frequency and may help to maintain the frequency accuracy required for accurate signaling. The first PLL 212 may also synchronize the phase of the transmitted signal with a reference signal, ensuring coherent transmission.

In embodiments, the second signal generator 112 includes a second phase-locked loop (PLL) 214. When being used to generate and transmit the continuous wave pulse via the first antenna 108 (e.g., the second PLL 214 functioning to generate the second continuous wave signal) the second PLL 214 may generate a carrier frequency and/or modulate the carrier signal by altering the carrier frequency in a controlled manner. For example, the second PLL may be used in the performance of linear frequency sweeps. When processing incoming signals (e.g., the second phase-locked loop (PLL) functioning as a receiver PLL), the second PLL 214 may demodulate the received signals by locking onto the frequency of the reflected incoming signal. By synchronizing with the phase and frequency of the incoming signal, the second PLL can track signal characteristics such as frequency shift.

The dual architecture of the radar sub-system 104 allows an operator and/or one or more controllers 118 to quickly switch the radar sub-system 104 back and forth between different detection modes. For example, during pulsed signal mode, the radar sub-system 104 uses separate transmitter and receiver frequency synthesizers (e.g., the transmitter frequency synthesizers being the first signal generator 106, and the receiver frequency synthesizer being the second signal generator 112). In continuous wave mode, the first signal generator 106 (e.g., and first PLL 212) is disabled, and the second signal generator (e.g., and second PLL 214) operates as the continuous wave source. Further, the radar receiver 114 may utilize quadrature down conversion for the received incoming signal, which enables high levels of RF image rejection (e.g., via the image reject mixer 208) at low intermediate frequencies, allowing the ADC 210 to operate in the first Nyquist band. For example, the output signal produced by the image reject mixer 208 may be processed by the ADC operating in a first Nyquist band.

Figure 3:
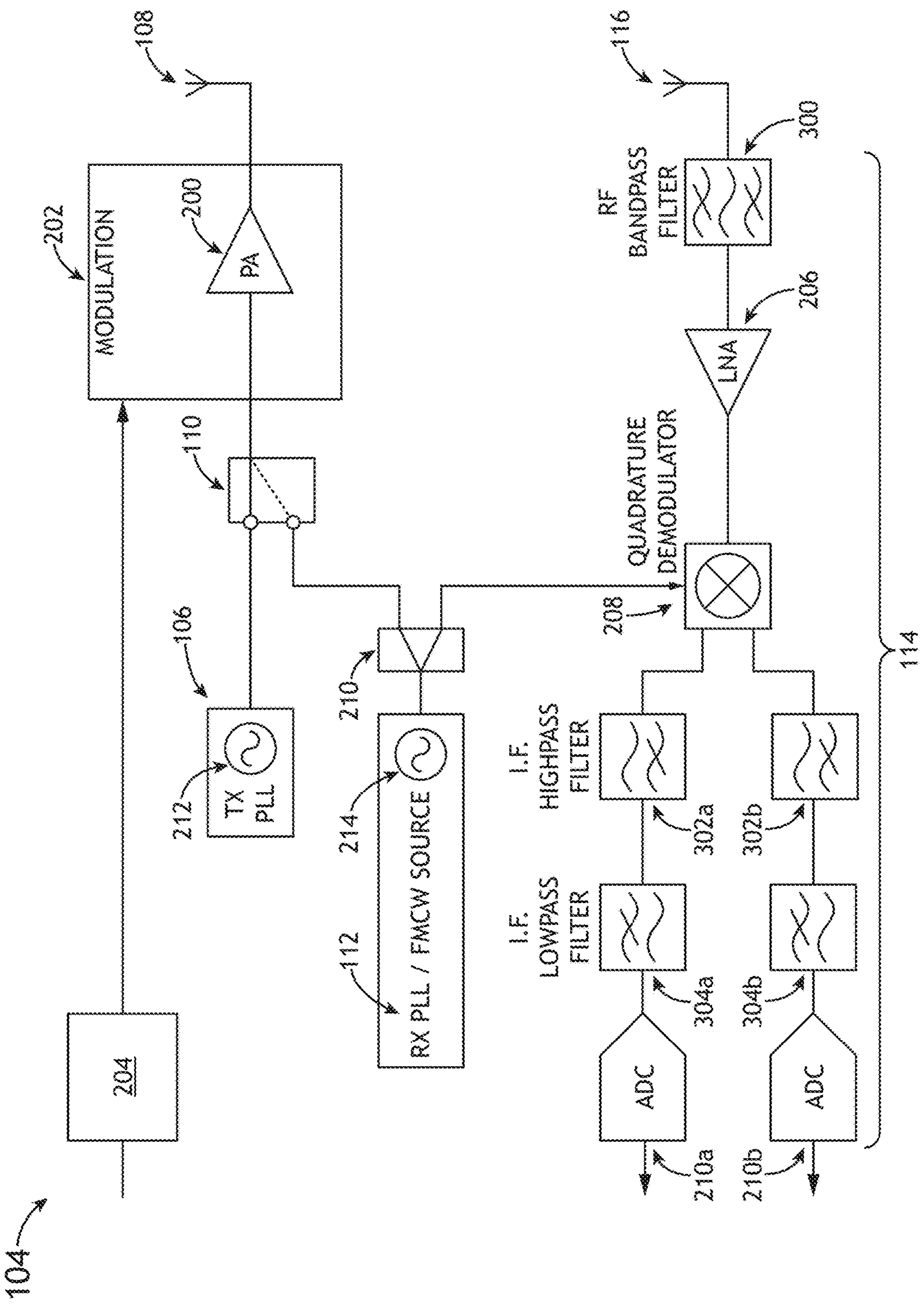
FIG. 3 illustrates a simplified schematic of the radar sub-system, in accordance with one or more embodiments of the disclosure.

FIG. 3 illustrates a simplified schematic of the radar sub-system 104, in accordance with one or more embodiments of the disclosure. In embodiments, the radar sub-system 104 includes one or more RF bandpass filters 300 communicatively coupled to or integrated within the radar receiver 114. The one or more RF band path filters provide at least partial RF image rejection to the incoming signals from the second antenna 116.

In embodiments, the radar sub-system 104 includes one or more high-pass intermediate frequency (IF) filters 302*a-b*. For example, one or more of the one or more high-pass IF filters 302*a-b* may be communicatively coupled to, or integrated within, the radar receiver 114. For instance, the one or more high-pass IF 302*a-b* filters may filter signals from the image reject mixer 208. The one or more high-pass IF filters 302*a-b* may attenuate the returns from close targets, which may reduce the dynamic range requirements of the IF and ADC 210*a-d* components of the radar receiver 114. The one or more high-pass IF filters 302*a-b* may also help ensure that any antenna leakage terms do not saturate or desensitize the receiver.

In embodiments, the radar sub-system 104 includes one or more low-pass IF filters 304*a-b* (e.g., narrowband filters). For example, one or more of the one or more low-pass IF filters 304*a-b* may be communicatively coupled to, or integrated within, the radar receiver 114. For instance, the one or more low-pass IF filters 304*a-b* may filter IF signals before they are received by the one or more ADCs 210*a-b*. The one or more low pass IF filters may provide relatively high levels of signal attenuation at the ADC alias frequencies. Because the one or more one or more RF bandpass filters 300, the one or more high-pass IF filters 302*a-b*, and the one or more low-pass IF filters 302*a-b* are all integrated within or communicatively coupled to the radar receiver 114, the one or more high-pass IF filters 302*a-b*, and the one or more low-pass IF filters 302*a-b* are also communicatively coupled to the second antenna 116.

In embodiments, the radar sub-system 104 may be integrated into any radar form or form factor. For example, the radar sub-system 104 may include or be integrated into multiple antenna systems such as a phased array radar (e.g., an active electronically scanned array (AESA) or a passive electronically scanned array (PESA). For example, the radar sub-system may be configured as an AESA that provides one or more radar functions including, but not limited to, weather detection, DDA function, runway environment imaging, and taxi guidance/obstacle detection. For instance, the first signal generator 106 and/or the second signal generator 112 may be integrated within a transceiver module of an AESA radar system.

The radar sub-system 104 may also be integrated into any single-antenna system as described above. The radar sub-system 104 may also be integrated into monostatic or bistatic radar systems.

Figure 4:
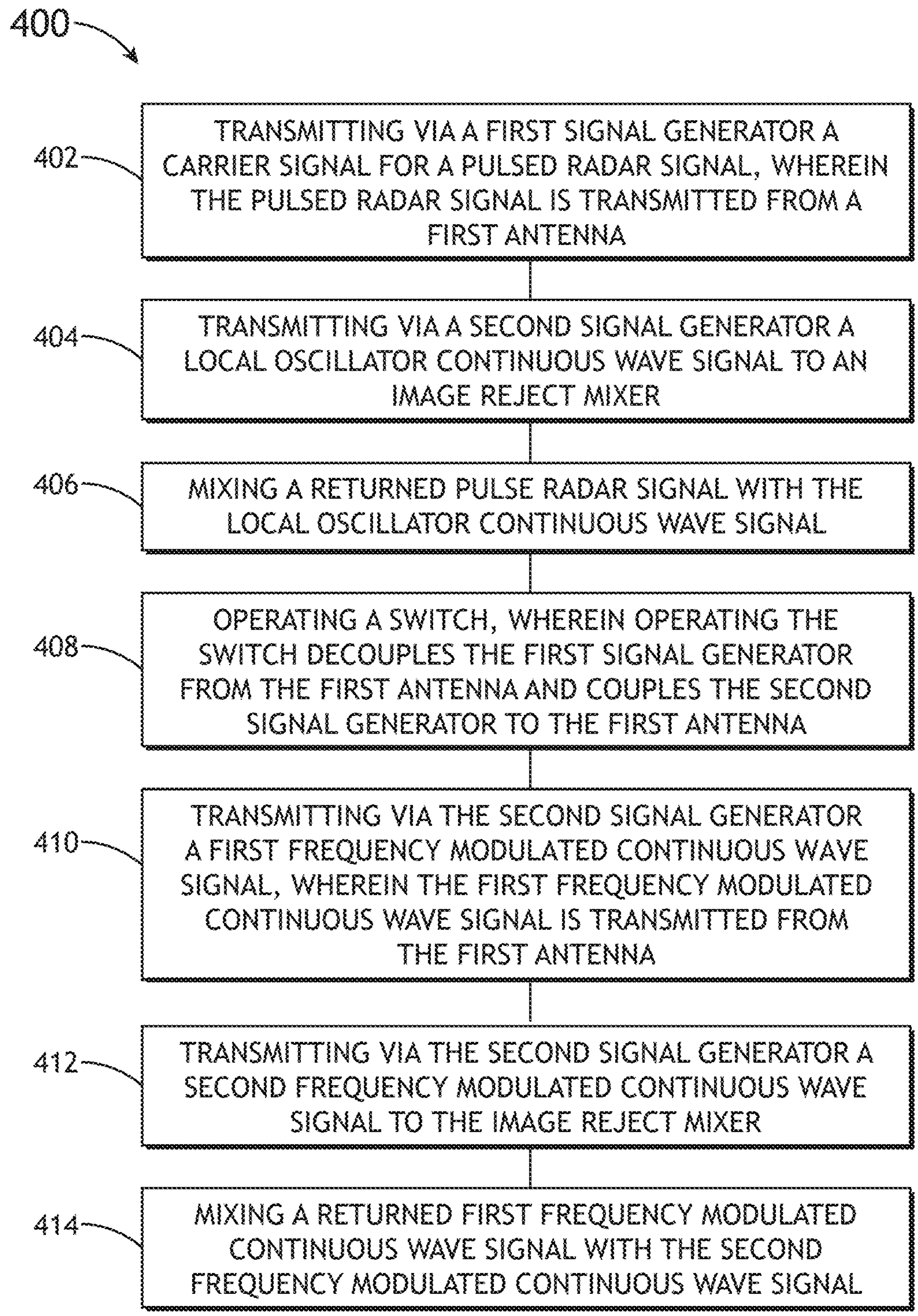
FIG. 4 illustrates a process flow diagram depicting a method 400 for switching a mode of operation of a radar sub-system from a pulsed radar mode to a continuous wave mode, in accordance with one or more embodiments of the disclosure.

FIG. 4 illustrates a process flow diagram depicting a method 400 for switching a mode of operation of a radar sub-system from a pulsed radar mode to a continuous wave mode, in accordance with one or more embodiments of the disclosure. The method 400 may be used via embodiments of the system 100 and the radar sub-system 104. While the method 400 discloses steps for switching the mode of operation from pulsed mode to continuous wave mode (FMCW), the steps of the method can be easily reversed such that the radar sub-system is switched from continuous wave mode to pulsed mode.

In embodiments, the method includes a step 402 of transmitting via the first signal generator 106 a carrier signal for a pulsed radar signal, wherein the pulsed radar signal is transmitted from a first antenna 108. In embodiments, the method 400 includes a step 404 of transmitting via the second signal generator 112 a local oscillator continuous wave signal to the image reject mixer 208. In embodiments, the method 400 includes a step 406 of mixing a returned pulse radar signal with the local oscillator continuous wave signal (e.g., via the image reject mixer 208).

In embodiments, the method 400 includes a step 408 of operating the switch 110, wherein operating the switch decouples the first signal generator 106 from the first antenna 108 and couples the second signal generator 112 to the first antenna 108. The switch 110 (e.g., by an operated utilizing an interface coupled to the controller 118) or operated manually by the controller 118. For example, when the aircraft 102 is on the ground, the radar sub-system 104 may be operating in continuous wave mode, then automatically switched to pulsed signal mode when the aircraft 102 reaches a threshold flight altitude.

In embodiments, the method 400 includes a step 410 of transmitting via the second signal generator 112 a first frequency modulated continuous wave signal, wherein the first frequency modulated continuous wave signals transmitted from the first antenna 108. In embodiments, the method 400 includes a step 412 of transmitting via the second signal generator 112 a second frequency modulated continuous wave signal to the image reject mixer. In embodiments, the method includes a step 414 of mixing a returned first frequency modulated continuous wave signal with the second frequency modulated continuous wave signal (e.g., via the image reject mixer 208.)

The one or more processors 120 of the controller 118 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 120 may include any device configured to execute algorithms and/or instructions (e.g., program instructions stored in memory). In embodiments, the one or more processors 120 may be embodied as a desktop computer, mainframe computer system, workstation, image computer, parallel processor, networked computer, or any other computer system configured to execute a program configured to operate or operate in conjunction with the system 100, aircraft, and/or radar sub-system 104 as described throughout the present disclosure The memory medium 122 may include any storage medium known in the art suitable for storing program instructions executable by the associated one or more processors 120 For example, the memory medium 122 may include a non-transitory memory medium. By way of another example, the memory medium 122 may include, but is not limited to, a read-only memory (ROM), a random-access memory (RAM), a magnetic or optical memory device (e.g., disk), a magnetic tape, a solid-state drive and the like. It is further noted that memory medium 122 may be housed in a common controller housing with the one or more processors 120. In embodiments, the memory medium 122 may be located remotely with respect to the physical location of the one or more processors 120 and controller 118. For instance, the one or more processors 120 of controller 118 may access a remote memory (e.g., server), accessible through a network (e.g., internet, intranet and the like).

In embodiments, the radar sub-system 104 is configured to be integrated with, added with, or otherwise used to retrofit, an aircraft 102. For example, the radar sub-system 104 may be integrated within an aircraft 102 having only a pulsed radar system, an aircraft having only a continuous wave (FMCW) radar system, or an aircraft with separated pulsed radar systems and continuous wave radar systems.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A radar sub-system comprising:

a first signal generator communicatively couplable to a first antenna via a switch and configured to generate a carrier signal for a pulsed radar signal, wherein the pulsed radar signal is transmitted via the first antenna;

an image reject mixer configured to receive a reflected signal from a second antenna;

a second signal generator capable of synthesizing a single fixed frequency or frequency modulated continuous wave signals, the second signal generator communicatively couplable to the first antenna via the switch and coupled to the image reject mixer, the second signal generator configured to:

generate, when the first signal generator is communicatively coupled to the first antenna, a local oscillator continuous wave signal to the image reject mixer, wherein the local oscillator continuous wave signal is mixed with a reflection of the pulsed radar signal; and generate, when the second signal generator is communicatively coupled to the first antenna 1) a first frequency modulated continuous wave signal via the first antenna, and 2) a second frequency modulated continuous wave signal to the image reject mixer, wherein the second frequency modulated continuous wave signal is mixed with a reflection of the first frequency modulated continuous wave signal received by the second antenna; and the switch configured to connect the first antenna to either the first signal generator or the second signal generator.

2. The radar sub-system of claim 1, further comprising an analog/digital converter (ADC) configured to receive an output of the image reject mixer.

3. The radar sub-system of claim 2, wherein the reflection of the pulsed radar signal or the reflection of the first frequency modulated continuous wave signal is processed via quadrature down conversion.

4. The radar sub-system of claim 3, wherein the reflection of the pulsed radar signal or the reflection of the first frequency modulated continuous wave signal is further processed by the ADC operating in a first Nyquist band.

5. The radar sub-system of claim 1, further comprising one or more RF bandpass filters communicatively coupled to the second antenna.

6. The radar sub-system of claim 5, further comprising one or more high-pass intermediate frequency (IF) filters communicatively coupled to the second antenna.

7. The radar sub-system of claim 6, further comprising one or more low-pass IF filters communicatively coupled to the second antenna.

8. The radar sub-system of claim 1, wherein the pulsed radar signal comprises a weather radar signal.

9. The radar sub-system of claim 1, wherein the first frequency modulated continuous wave signal comprises a taxi guidance signal.

10. The radar sub-system of claim 1, wherein the first signal generator is integrated within a transceiver module of active electronically scanned array (AESA) radar system.

11. A method for switching a mode of operation of a radar sub-system from a pulsed radar mode to a continuous wave mode comprising:

transmitting via a first signal generator a carrier signal for a pulsed radar signal, wherein the pulsed radar signal is transmitted from a first antenna;

transmitting via a second signal generator a local oscillator continuous wave signal to an image reject mixer;

mixing a returned pulse radar signal with the local oscillator continuous wave signal;

operating a switch, wherein operating the switch decouples the first signal generator from the first antenna and couples the second signal generator to the first antenna;

transmitting via the second signal generator a first frequency modulated continuous wave signal, wherein the first frequency modulated continuous wave signal is transmitted from the first antenna; and transmitting via the second signal generator a second frequency modulated continuous wave signal to the image reject mixer; and mixing a returned first frequency modulated continuous wave signal with the second frequency modulated continuous wave signal.

12. The method of claim 11, wherein the radar sub-system comprises:

the first signal generator;

the image reject mixer; and the second signal generator.

13. The method of claim 11, further comprising sending an output of the image reject mixer to an analog/digital converter (ADC).

14. The method of claim 13, further comprising processing a reflection of the pulsed radar signal or a reflection of the first frequency modulated continuous wave signal via quadrature down conversion.

15. The method of claim 14, wherein the reflection of the pulsed radar signal or the reflection of the first frequency modulated continuous wave signal is further processed by the ADC operating in a first Nyquist band.

16. The method of claim 11, further comprising filtering the returned pulse radar signal via one or more RF bandpass filters.

17. The method of claim 16, further comprising filtering an intermediate frequency output from the image reject mixer via one or more high-pass intermediate frequency (IF) filters.

18. The method of claim 17, further comprising filtering an intermediate frequency output received from the one or more high-pass IF filters via one or more low-pass intermediate frequency filters.

19. The method of claim 11, wherein the first frequency modulated continuous wave signal comprises a taxi guidance signal.

20. The method of claim 11, wherein the first signal generator is integrated within a transceiver module of active electronically scanned array (AESA) radar system.

* * * * *